May 26, 1925.

A. M. ZELLNER 1,539,805

EYESHADE

Filed July 14, 1923

A. M. Zellner,
Inventor.

By C. A. Snow & Co.

Attorney

Patented May 26, 1925.

1,539,805

UNITED STATES PATENT OFFICE.

ANNA M. ZELLNER, OF ST. PAUL, MINNESOTA.

EYESHADE.

Application filed July 14, 1923. Serial No. 651,537.

*To all whom it may concern:*

Be it known that I, ANNA M. ZELLNER, a citizen of the United States, residing at St. Paul, in the county of Ramsey and State of Minnesota, have invented a new and useful Eyeshade, of which the following is a specification.

This invention relates to eye shades, and more particularly to an eye shade especially designed for attachment to eye glasses or the like.

The primary object of the invention is to provide a device of this character which may be carried in the pocket of the user, and one wherein the shade may be readily and easily positioned for use.

A further object of the invention is to provide a shield of the adjustable type, whereby the width of the shield may be adjusted to meet the requirements of usage.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figures 1, 2:
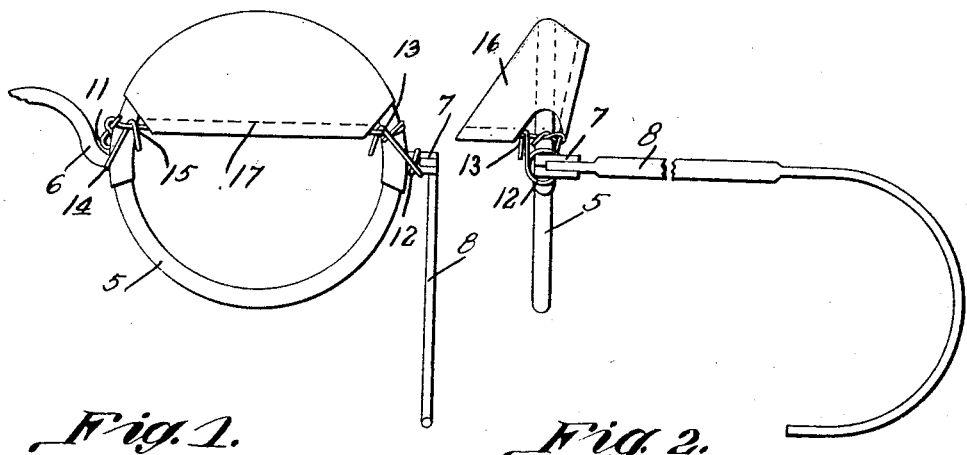
Figure 1 is an elevational view disclosing a shield as positioned for use.
Figure 2 is an end elevational view thereof.

Referring to the drawing in detail, the reference character 5 designates the eye glass frame to which the shield is secured, the frame including a nose piece 6 and bearing member 7 to which the ear piece 8 is connected.

Figure 3:
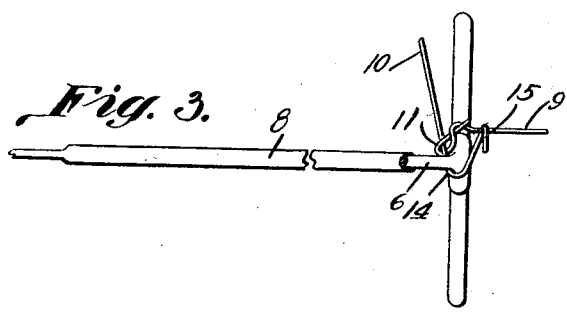
Figure 3 is an enlarged detail view disclosing the manner of securing the ends of the shield to the eye glass frame.

The shade includes a frame formed preferably of wire material and includes a front section 9 and a rear section 10, the front section being looped around the rear section at 11 as clearly shown by Figure 3 of the drawing, the rear section 10 is looped around the bearing member 7 at 12, the extremity of the rear section adjacent to the loop portion 12 being formed into a loop member 13 adapted to be hooked over the front section 9 to secure the section to the eye glass frame, The opposite end of the rear section extends under the nose piece at 14 where the same is formed into a hook member 15 to be hooked over the front section 9 as clearly shown by Figure 3 of the drawing.

As shown, the rear section slants inwardly so that the cover which is connected to the section will shade the eye against light entering between the eye shade and forehead of the user. The cover or shade proper is indicated at 16 and is formed of any suitable flexible material, the same being held to the frame by means of the lines of stitching 17.

From the foregoing it will be seen that should it be desired to position a shield constructed in accordance with the invention, the hook members are moved to their proper positions with respect to the nose piece and bearing member, the hook members being now positioned over the front section of the frame in a manner as shown and described.

It might be further stated that when the shield is not in use, it may be folded into a small and compact article to be positioned in the pocket of the user.

What I claim as new is:—

In an eye glass shield, a frame including a length of wire bent upon itself to provide a forward section and a rear section, one end of the wire being formed into a loop to embrace a portion of an eye glass frame, the opposite end of the wire being formed into a hook member, said hook member adapted to be passed over a portion of an eye glass frame to secure the shield to the frame, and a flexible member having connection with the forward and rear sections to overlie a portion of an eye glass frame to support the eye glass shield in an extended position.

In testimony that I claim the foregoing as my own, I have hereto affixed my signature in the presence of two witnesses.

ANNA M. ZELLNER.

Witnesses:
ERNEST BIRCHULL,
J. A. CASSIDY,